Figure 1:
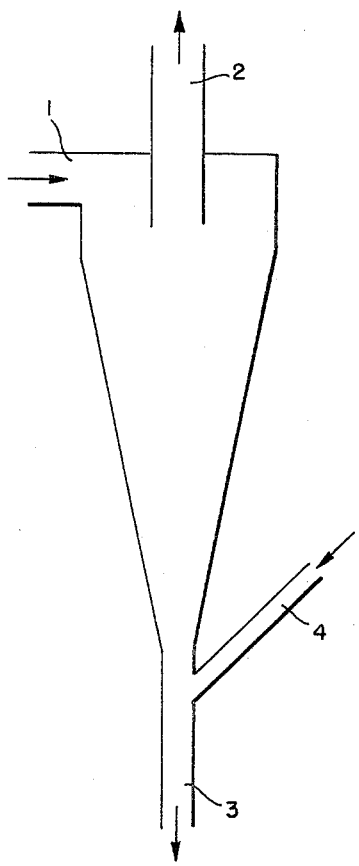

Aug. 9, 1966 G. WITTMANN 3,264,800
PROCESS OF DISCHARGING PULVERULENT MATERIALS, ESPECIALLY
VERY FINE DUST, FROM CYCLONES
Filed Nov. 5, 1962

INVENTOR:
GEORG WITTMANN
BY Margale, Johnston, Cook & Root
ATT'YS 3,264,800
PROCESS OF DISCHARGING PULVERULENT MATERIALS, ESPECIALLY VERY FINE DUST, FROM CYCLONES
Georg Wittmann, Ludwigshafen (Rhine), Germany, assignor to Badische Anilin- & Soda-Fabrik Aktiengesellschaft, Ludwigshafen (Rhine), Germany
Filed Nov. 5, 1962, Ser. No. 235,367
Claims priority, application Germany, Aug. 7, 1958, B 49,884
2 Claims. (Cl. 55—1)

This application is a continuation-in-part of my application Ser. No. 828,930, filed July 23, 1959 and now abandoned.

This invention relates to an improved method for withdrawing pulverulent materials, especially very fine dust, from cyclones.

The dust separated in the cyclone chamber of cyclones which are used for the separation of dust from gases is usually withdrawn through closure means, such as valves, discharge gates, or rotary air locks.

The closure means may, however, give rise to disturbances in operation, especially when discharging reactive or hot dust, or when very fine dusts are to be discharged which have little mobility and clog the closure means.

It has already been proposed, in order to discharge dust from cyclones, to keep the pulverulent material to be discharged in fluidized motion at the dust outlet end of the cyclone by using as the lower closure of the cyclone a finely-pored gas-permeable plate through which gas is led into the material separated in the cyclone and withdrawing it laterally from the fluidized bed thus formed. By operating in this way, movement of the dust to be discharged is promoted by the gas introduced through the porous plate and clogging of the dust outlet is avoided. However, collection efficiency is reduced, since part of the gas introduced passes from the fluidized bed into the cyclone chamber and carries especially fine dusts back into the cyclone chamber. Reduced collection efficiency will result especially when the dust to be separated contains appreciable amounts of very fine particles of 10 to 15 microns or less.

For the foregoing reasons it is desirable to discharge collected dust from cyclones without the use of closure means of the said type.

According to another known process using rotary air locks as discharging means, coarse particles of solid material plus moisture are introduced into the dust-laden gas before the gas enters the actual cyclone. The purpose of this measure is to cause the fines suspended in the gas to agglomerate with the coarser particles and thus separate them from the gas in the cyclone together with the coarser particles. The additionally introduced coarse particles are intended as nuclei around which the extreme fines agglomerate. The fines are not removed from the gas until they have agglomerated with the additionally introduced solid particles.

A variation of the process consists in removing a portion of the gas containing the fines and returning it to the cyclone by means of a valve so that it may once more be treated with the coarse particles.

The effectiveness of this process depends on the residence time of the solid particles in the cyclone. It is thus important that the grain size of the agglomeration nuclei added should not be too large. Their size should be such that they are not removed from the gas stream before the dust which is to be separated has had time to agglomerate around them.

I have now found that pulverulent material, especially very fine dust, which material has a tendency to plug the dust outlet of a cyclone used for separating said material from a gas stream passing through the cyclone, can be discharged in a simple way and without disturbances by supplying direct to said material, after separation thereof from the gas in said cyclone and during the discharge thereof from said cyclone through the dust outlet, material being inert to the dust and to said gas and having a grain spectrum between 0.5 and 50 millimeters, and discharging the collected dust together with said inert material through said dust outlet.

The inert material may be, for example, quartz, porcelain, steel balls or the same material as the dust to be discharged.

By adding an inert material the grain size of which varies from between 0.5 and 50 millimeters increased mobility of the dust to be discharged, as compared with the mobility obtainable by using an inert material of a single grain size, is obtained. Advantageously, an inert material is used which consists of equal parts by weight of fractions having grain size spectra from 0.5 to 15 millimeters, 15 to 30 millimeters and 30 to 50 millimeters. By using such material, optimum mobility of the dust to be discharged is achieved.

The inert material may be added at an earlier stage, when it is introduced into the settling chamber of the cyclone. The invention will be further illustrated by the accompanying drawings, which show, by way of example, embodiments of cyclones suitable for carrying out the process according to the present invention. FIGURE 1 is a diagrammatic view of a cyclone separator and FIGURE 2 is a diagrammatic view of a cyclone separator provided with a settling chamber, similar parts being identified by identical reference numerals.

Figure 2:
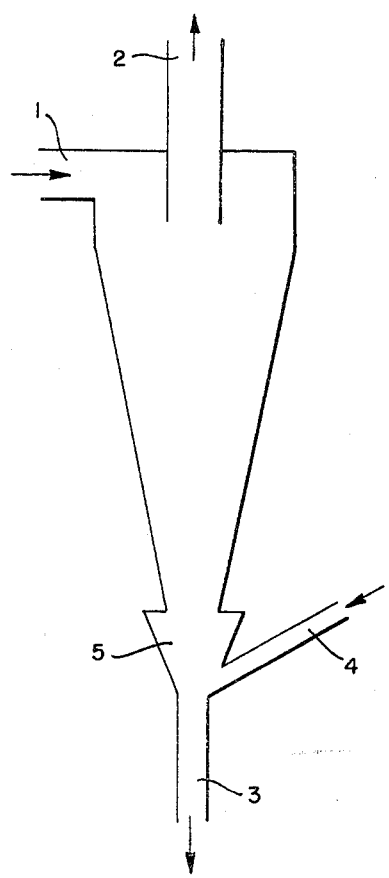

Referring to FIGURES 1 and 2, the cyclone separators shown are provided with an inlet 1 for the dust-laden gas, an outlet 2 for the gas from which the dust has been separated, and an outlet 3 for discharging the dust. Conduit 4 serves for introducing the inert material into the dust collected in the cyclone. Whereas in FIGURE 1 this conduit is connected immediately to outlet 3, FIGURE 2 shows an arrangement where the inert material is introduced through conduit 4 into a settling chamber 5 from which the inert material together with the dust collected in the said chamber is discharged through outlet 3.

For later processing of the dust it is immaterial whether the inert material has the same or a different composition from the dust since the dust can be readily separated from the inert material, e.g., by screening, magnetic separation or any other conventional method. For this reason, the inert material separated from the dust may be recycled without any difficulty.

In the case of dusts of very low mobility, the relative proportions of dust and inert material may be adjusted in favor of the latter to such an extent that adequate mobility of the dust is always ensured.

By the process according to the present invention, the collection efficiency of cyclones is improved in terms of quantity, and owing to the increased mobility of the dust the risk of plugging is precluded. The continuous discharge of dust from the cyclone is of considerable importance for a satisfactory separation of dust in the cyclone. Another advantage of the new process is that when transferring the dust discharged from the cyclone into an attached reaction chamber, a gas exchange between the interior of the cyclone and the reaction chamber is prevented by the rolling granular material even when a static pressure difference exists between these two spaces. The length of the outlet duct through which the dust and the inert material are passed may be adapted to the pressure difference prevailing between the cyclone and the reaction chamber.

The process is also suitable for connecting two reaction stages containing gases of different compositions and when the gases of the individual stages should not come into contact with one another. Examples of reactions of the kind in question are the oxidative regeneration of catalysts with recycling of the catalyst to the zone in which the catalytic conversion takes place, the roasting of ores, the chlorination of metals and metal oxides, whether or not such reactions are carried out in fluidized bed processes.

I claim:

1. A process for discharging from cyclones dusty materials having a particle size of less than about 15 microns and a tendency to plug the dust outlet of the cyclone, which process comprises: supplying direct to said dusty material, only after separation thereof from the gas in said cyclone and during the discharge thereof through said dust outlet, a material which is inert to said dusty material and to said gas passing through said cyclone, said material having a grain size spectrum of from 0.5 to 50 millimeters, and discharging the collected dusty material together with said inert material through said dust outlet.

2. A process as claimed in claim 1, wherein said inert material is supplied to a settling chamber arranged in the lower part of said cyclone, said chamber being adapted to receive the dust separated from said gas and the collected dust being discharged from said chamber together with said inert material through said dust outlet.

References Cited by the Examiner

UNITED STATES PATENTS

| | | | |
|---|---|---|---|
| 1,916,337 | 7/1933 | Schmidt | 55—346 X |
| 2,430,976 | 11/1947 | Dutra. | |
| 2,588,106 | 3/1952 | Franquist | 55—92 |
| 2,792,316 | 5/1957 | Broman | 134—7 |
| 2,924,294 | 2/1960 | Johnstone | 55—107 X |
| 3,011,638 | 12/1961 | Glover | 209—211 |

HARRY B. THORNTON, *Primary Examiner.*